Patented Aug. 18, 1936

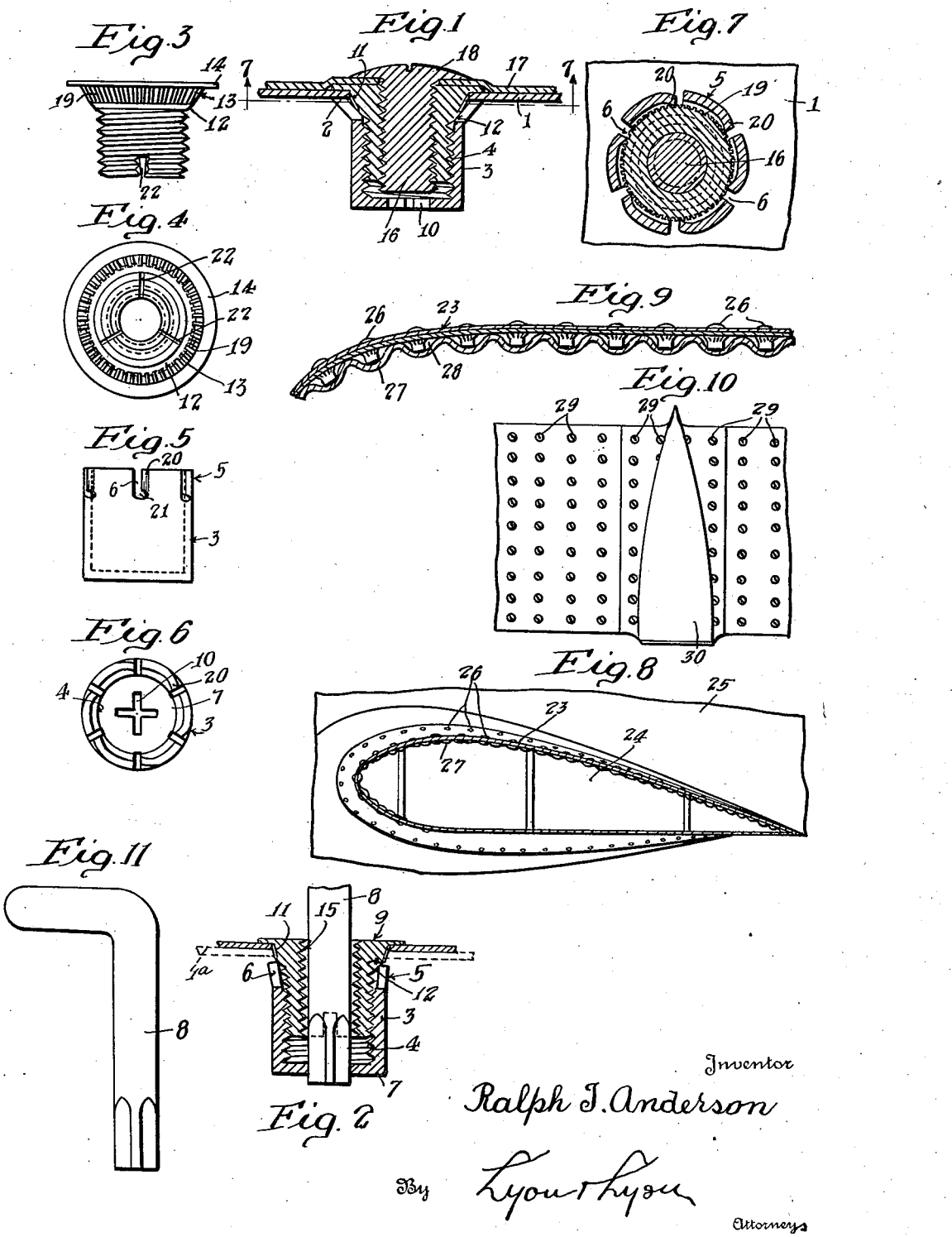

2,051,066

UNITED STATES PATENT OFFICE 2,051,066

FASTENING

Ralph I. Anderson, Ocean Park, Calif.

Application December 10, 1934, Serial No. 756,803

6 Claims. (Cl. 85—40)

This invention relates to a fastening, and while the invention may be employed in many situations, it is intended to have its greatest usefulness for making a connection to a plate where the plate is only accessible from one side. The fastening is particularly useful where the plate is so thin that it is not feasible to thread it at the edge of the opening. The invention is particularly useful when applied in building and repairing airplanes for the reason that in such operations, there are many situations where a plate must be fastened on the outer side of another plate where the plates are not accessible from both sides. The fastening is particularly useful in securing fillet plates on airplanes where the wing joins the side of the fuselage. At this point and at other points, such fillet plates are employed to streamline the structure.

One of the objects of my invention is to provide a fastening of simple construction, which can readily be applied to an opening from one side, and also to provide the parts of the fastening with means which will prevent the fastening from working loose from vibration.

One of the objects of the invention is to provide a simple fastening of this character, which can be applied in an opening accessible only from one side, and which affords means for providing a substantially secured socket member which can be employed for making any kind of an attachment; also to provide means which may be secured in the socket member for securing a member such as a thin plate to the outer side of the plate on which the fastening is mounted.

Further objects of the invention will appear hereinafter.

The invention consists in the novel parts and combination of parts to be described hereinafter, all of which contribute to produce an efficient fastening.

A preferred embodiment of the invention is described in the following specification, while the broad scope of the invention is pointed out in the appended claims.

In the drawing:

Figure 1 is a vertical section through a pair of plates secured together by means of my fastening device, and in this view the parts of my device are shown in vertical section.

Figure 2 is a view similar to Fig. 1, but showing only the main plate and illustrating the manner in which the fastening is applied to an opening in the plate. This view illustrates a tool which is used in this operation, and the upper portion of which is broken away.

Figure 3 is a side elevation of the inner piece of my fastening, and which I refer to in the specification as an "expander."

Figure 4 is a bottom plan of the expander illustrated in Fig. 3.

Figure 5 is a side elevation of the outer piece or thimble which cooperates with the expander.

Figure 6 is a top plan view of the thimble illustrated in Figure 5.

Figure 7 is a horizontal section taken on the line 7—7 of Fig. 1, and particularly illustrating the locking means which I prefer to employ for preventing loosening of the fastening from vibration.

Figure 8 is a vertical section through an airplane wing, and showing a portion of a fuselage to which the wing is attached. The fuselage is broken away. This view particularly illustrates the use of my fastening device for attaching a fillet plate for streamlining the angle between the airfoil or wing, and the fuselage.

Figure 9 is a fragmentary view, and shows a portion of the upper plate of the wing illustrated in section in Figure 8. This view illustrates how my fastening device can be used where a corrugated reinforcing plate is carried inside of the main plate of the wing.

Figure 10 is a plan showing a portion of a wing broken away, and this view also illustrates a motor housing carried by the wing, and illustrates the use of my fastener at points on the wing, which would be inaccessible from the interior.

Figure 11 is a side elevation of the tool which I prefer to employ in securing my fastening to a plate.

Before proceeding to a more detailed description of the device, it should be stated that the device comprises two main parts, one of which is an outer sleeve which I call a "thimble" and the inner of which is an inner sleeve, which I call an "expander." The thimble is constructed of a diameter small enough to enable it to be passed through the opening in the plate to which the fastening is to be applied, and the inner end of the thimble, which will be adjacent to the edge of the opening, is expansible. In applying the fastening to a plate, the expander is secured in the outer end of the thimble, and the thimble is then shoved through the opening in the plate. These two parts are so constructed that after the thimble has been positioned back of the plate, a relative movement of the expander and the thimble will expand the expansible end of the thimble and force it up against the inner edge of the plate. In order to accomplish this most readily, I prefer to employ a thread connection between the expander and the thimble. It is also preferable to provide interlocking means between the expansible end of the thimble and the expander, so as to prevent the fastening from becoming loose from vibration.

In order to enable the thimble to be rotated relative to the expander after the thimble has been passed through the opening, I prefer to provide a bore in the expander, through which the inner end of the thimble can be reached by a tool. This bore is preferably threaded so that this threaded bore would operate as a socket for securing anything to the fastening. Where the fastening is employed to secure an outer plate, I prefer to employ a stud that screws into this bore and has a head to secure the outer plate against the outer end of the expander. Furthermore, I prefer to provide means cooperating with the stud and the expander to prevent loosening of the stud.

Referring more particularly to the parts, and especially to Figs. 1 and 2, 1 indicates a plate having an opening with an edge 2, and in which the fastening is to be applied. The fastening comprises an outer sleeve which I call a "thimble" 3, said sleeve having internal threads 4 and being constructed at its outer end 5 so that it is expansible. In order to accomplish this, I prefer to provide the inner end 5 of the sleeve with a plurality of slots 6, which extend longitudinally in its cylindrical wall. At the inner end of the thimble means is provided preferably in the form of a transverse disc or head 7, which will cooperate with a tool 8 to effect the relative movement between the thimble and the inner member or expander 9 when the fastening is secured to the plates. This is illustrated in Figure 2. The inner end of the tool 8 has a cross section of any suitable form, such as that illustrated for engaging in a slot or opening 10 in the head 7. The expander 9 has a tapered shank 11, and this tapered shank preferably has two parts: an inner part in the form of a shoulder 12, the elements of which are inclined at about the angle of 45° to the axis of the expander, and the shank includes an outer portion 13 of larger diameter, which may be considered a conical head which preferably terminates in the projecting flange 14 at its outer end. Having inserted the thimble 3 through the opening in the manner illustrated in Fig. 2, the tool 8 is then applied so as to rotate the thimble on the expander. When this occurs the shoulders 12 and 13 cooperate to force the split end 5 of the thimble outwardly under the edge 2 of the opening and against the inner side of the plate.

In order to enable the tool 8 to pass through the expander 9, I provide the expander 9 with a threaded bore 15. The threads are not necessary to permit the tool to pass through, but they are useful in enabling a third piece to be secured in place where an attachment is to be made on the outer side of the plate 1. This threaded bore 15 constitutes a socket in which any part can be secured, for example, a small post or stanchion. In the present instance, I illustrate a stud 16 secured in this threaded bore, said stud having a threaded shank for this purpose. Such a stud can be used to secure an outer plate 17 in position, (see Fig. 1), in which case the outer plate is provided with an opening through which the shank or stud 16 passes, and the stud 16 has a head 18 engaging the outer side of the outer plate 17.

In many situations, particularly where the fastening is subjected to vibration as it is on an airplane, I prefer to provide a locking means to prevent unscrewing of the thimble 3 after it has been tightened up. Any suitable means may be employed for this purpose, but I prefer to provide knurling on the tapered shoulder 13, so that longitudinal ribs 19 are formed on this part (see Fig. 7, in which this knurling is illustrated in an exaggerated manner). Furthermore, the longitudinal edges of the slots 6 are offset inwardly to form rudimentary teeth 20 to engage with the knurling ribs 19. This is clearly illustrated in Figure 7.

Furthermore, these ribs 19 engage with the edge 2 of the opening in the plate 1, and operate to prevent rotation of the expander when the thimble is being backed up onto it by rotating it through the medium of the tool 8. However, it is obvious that any desired means may be employed for holding the expander from rotating when the thimble is backed up, and it is also obvious that if the fastening is to be used without the locking means, the thimble 3 could be held against rotation by means of the tool 8 while the expander is rotated by any suitable means. But as stated above, it is preferable to provide the interlocking means, in which case the relative rotation of the thimble and expander takes the form of rotation of the thimble on the fixed expander.

It is preferable to provide the inner ends of the slots 6 of the thimble 3 with lateral notches 21, (see Fig. 5). This enables the inwardly offset teeth 20 to be more readily bent inwardly in forming this piece.

It is also preferable to construct the expander in such a way that it will lock the stud 16 against working loose. For this purpose I prefer to provide a plurality of slots 22 extending radially in the inner end of the expander. (See Fig. 3.) These slots are relatively wide, and after forming them the material is compressed. In this way the diameter of the inner end of the expander is slightly reduced, and hence when the stud 16 is screwed into place, there is considerable compression against it exerted by the end of the expander. The stud is preferably considerably longer than the expander, so that its inner end projects somewhat as indicated in Fig. 1.

In Figs. 8, 9 and 10, I illustrate the manner in which this fastening may be employed in airplane construction. In Fig. 8, I illustrate the use of a fillet plate 23, which is worked around in the angle formed between a wing 24 and the side of the fuselage 25. In this view, 26 indicates the fastening devices. They are applied from the outer side of the fillet plate 23, so that this fillet plate will correspond to the plate 17 in Fig. 1.

In case the wing plate is reinforced by a corrugated reinforcing plate 27, as illustrated in Figs. 8 and 9, the fastening devices should be applied in the valleys or grooves 28 of these corrugations.

Figure 10 illustrates a plurality of my fastening devices 29 for securing outer plates in the vicinity of a motor housing, or nacelle 30.

This fastening is extremely useful in airplane construction, because in the present practice, it is frequently necessary to put in fastenings for this general purpose, which are located at a long distance from the worker. For example, 4 ft. or even greater distances. With my fastening, it is not necessary to have any access whatever, to the inner face of the plate to which the fastening is applied. It will also be evident that the fastening is very simple, consisting as it does, of only two or three pieces which can be manufactured in large quantities at low cost.

It will be evident that the thimble and the expander can be used without any stud to secure two plates together. This is illustrated in Fig. 2, in which an inner plate 1a is indicated by dotted lines. In this case, if desired, the bore of the expander can be closed by a plug corresponding to the stud 16.

It is understood that the embodiment of the invention described herein, is only one of the many embodiments this invention may take, and I do not wish to be limited in the practice of the invention, nor in the claims, to the particular embodiment set forth.

What I claim is:

1. In a fastening device to be secured to an opening in a plate, the combination of a thimble capable of passing through the opening, said thimble having an expansible edge to lie adjacent to the edge of the opening, and having an internal thread beyond the expansible edge, an expander having threaded engagement with the said thread, insertable through the opening, and having a head for engagement with the edge of the opening in the plate, said expander having a bore therethrough for the insertion of a tool to engage the end of the thimble remote from the opening, said remote end of the thimble having means for engaging the tool to enable the thimble to be rotated relative to the expander after the expander has been inserted in the opening, to expand the expansible edge of the thimble and force the same outwardly and under the edge of the opening in the plate.

2. In a fastening device to be secured to an opening in a plate, the combination of a thimble capable of passing through the opening, said thimble having an expansible edge to lie adjacent to the edge of the opening, and having an internal thread beyond the expansible edge, an expander having threaded engagement with the said thread, insertable through the opening, and having a head for engagement with the edge of the opening in the plate, said expander having a bore therethrough for the insertion of a tool to engage the end of the thimble remote from the opening, said remote end of the thimble having means for engaging the tool to enable the thimble to be rotated relative to the expander after the expander has been inserted in the opening, to expand the expansible edge of the thimble and force the same outwardly and under the edge of the opening in the plate, and integral means on said expander providing an interlocking connection between the expansible end of the thimble and the said expander to prevent relative rotation of the expander and the thimble in a direction to loosen the thimble.

3. In a fastening device to be secured to an opening in a plate, the combination of a thimble capable of passing through the opening, said thimble being of substantially cylindrical form, having a split edge to lie adjacent the edge of the opening and having a threaded bore beyond the split edge, an expander having threaded engagement with the threaded bore, insertable through the opening, having a head for engagement with the edge of the opening in the plate, said bore enabling the insertion of a tool, the inner end of said thimble having means for engaging the tool to enable the thimble to be rotated relative to the expander after the expander has been inserted in the opening, said expander having a shoulder for engaging the split edge of the thimble to force the same outwardly and under the edge of the opening in the plate.

4. In a fastening device to be secured to an opening in a plate, the combination of a thimble capable of passing through the opening, said thimble being of cylindrical form having an internal thread and having a head at its inner end remote from the opening, the outer edge of said thimble adjacent the opening having a plurality of slots therein enabling the edge of the thimble to be expanded, an expander insertable through the opening in the plate and having threaded connection with the internal thread of the thimble, and having a shoulder for engaging the wall of the thimble at its slotted end for expanding the same outwardly and under the edge of the opening, said expander having a bore therethrough for the insertion of a tool, and the said inner head of the thimble having means for engaging the tool for effecting a relative rotation of the thimble and expander to expand the slotted end of the thimble and clamp the edge of the opening between the expander and the thimble.

5. In a fastening device to be secured to an opening in a plate, the combination of a thimble capable of passing through the opening, said thimble having an expansible edge to lie adjacent to the edge of the opening, and having an internal thread beyond the expansible edge, an expander having threaded engagement with the said thread, insertable through the opening, and having a head for engagement with the edge of the opening in the plate, said expander having a bore therethrough for the insertion of a tool to engage the end of the thimble remote from the opening, said remote end of the thimble having means for engaging the tool to enable the thimble to be rotated relative to the expander after the expander has been inserted in the opening to expand the expansible edge of the thimble and force the same outwardly and under the edge of the opening in the plate, the inner end of said expander having a slot therein and being compressed to a reduced diameter at its tip, said bore being threaded, and a stud having a thread received in the bore for securing a member on the outer side of the plate, the inner end of said stud operating to expand the inner end of the expander to lock the stud in position when it is tightened up.

6. In a fastening device to be secured to an opening in a plate, the combination of a thimble capable of passing through the opening, said thimble having an expansible edge to lie adjacent to the edge of the opening, and having an internal thread beyond the expansible edge, an expander having threaded engagement with the said thread, insertable through the opening, and having a head for engagement with the edge of the opening in the plate, said expander having a bore therethrough for the insertion of a tool to engage the end of the thimble remote from the opening, said remote end of the thimble having means for engaging the tool to enable the thimble to be rotated relative to the expander after the expander has been inserted in the opening, to expand the expansible edge of the thimble and force the same outwardly and under the edge of the opening in the plate, said bore being threaded, and a stud screwed into the bore from its outer end, having a head to secure a member on the outer side of the expander, said bore being of reduced diameter at its inner end so as to clamp the inner end of the stud and secure the same against accidental removal.

RALPH I. ANDERSON.